May 22, 1928.
E. L. FIRTH
SPROCKET WHEEL
Filed Aug. 1, 1927
1,670,718
3 Sheets-Sheet 1
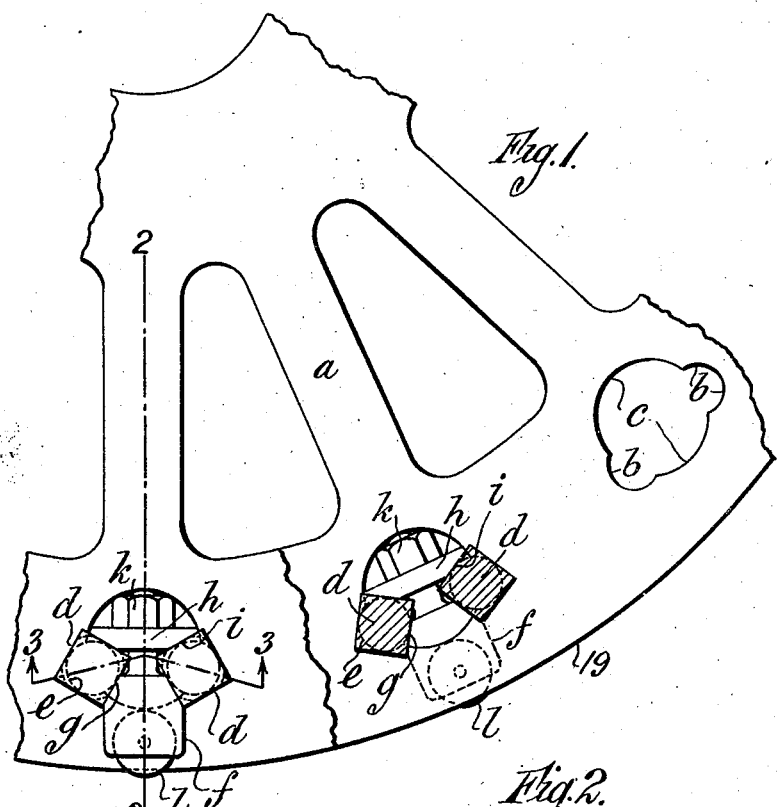
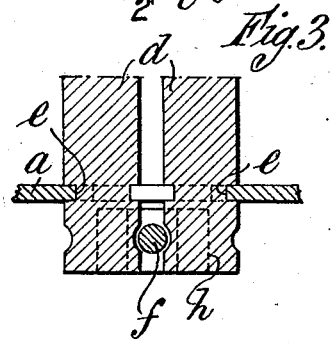
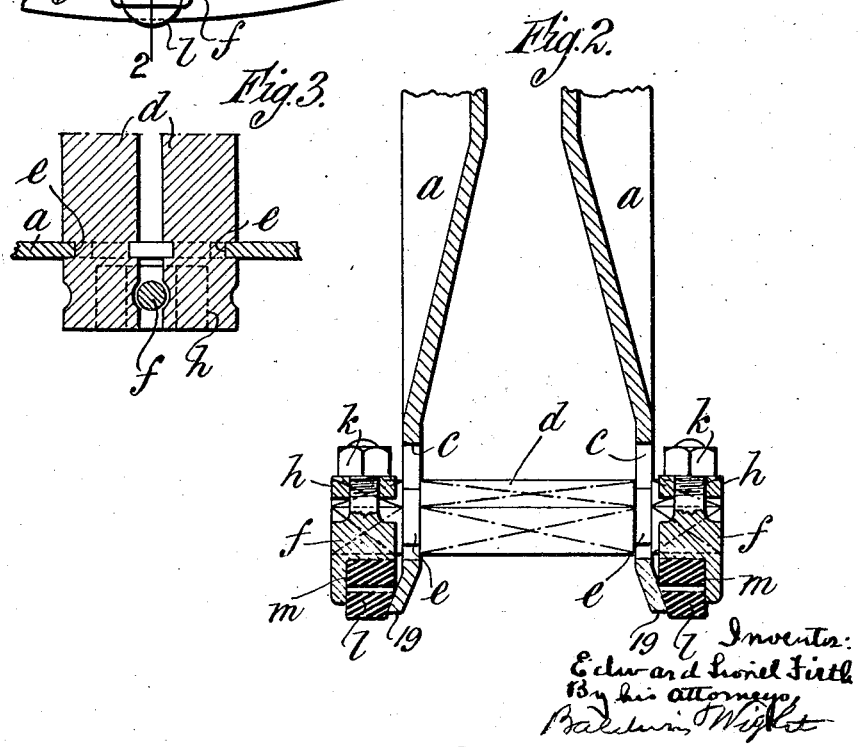
Inventor:
Edward Lionel Firth
By his attorneys,
Baldwin Wright

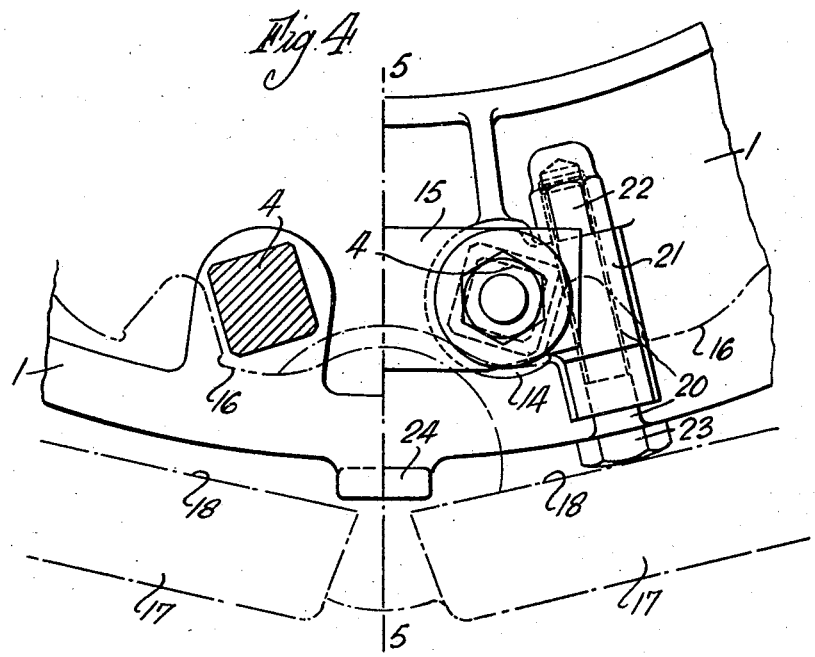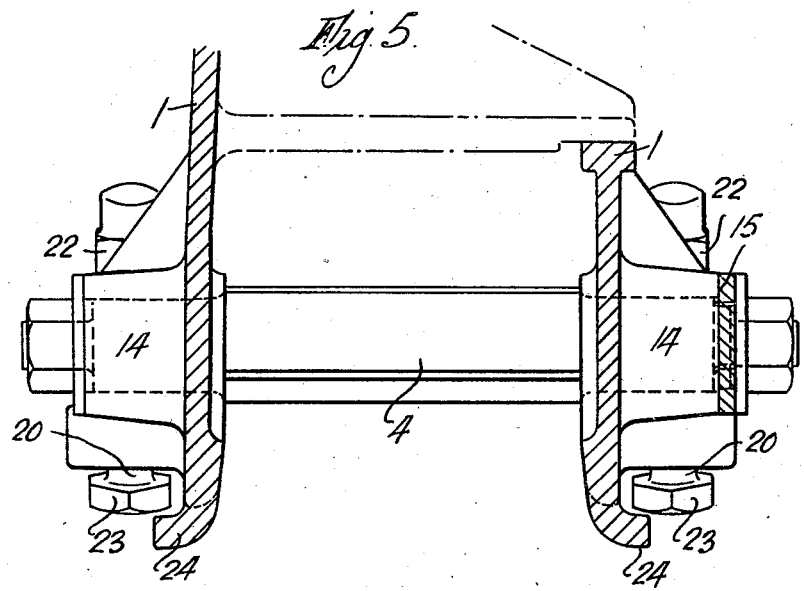

May 22, 1928.
E. L. FIRTH
SPROCKET WHEEL
Filed Aug. 1, 1927
1,670,718
3 Sheets-Sheet 3
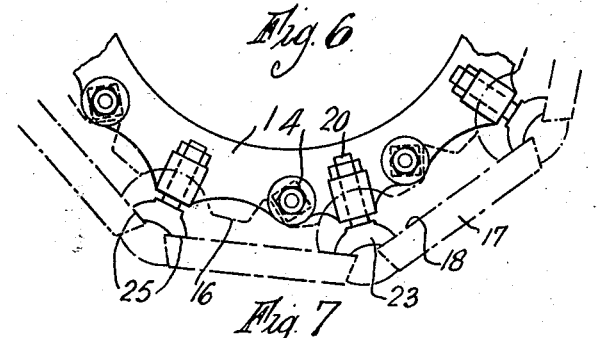
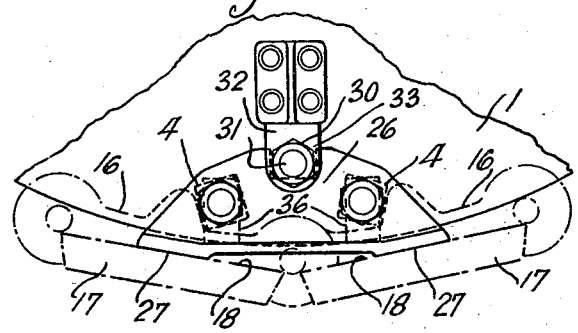
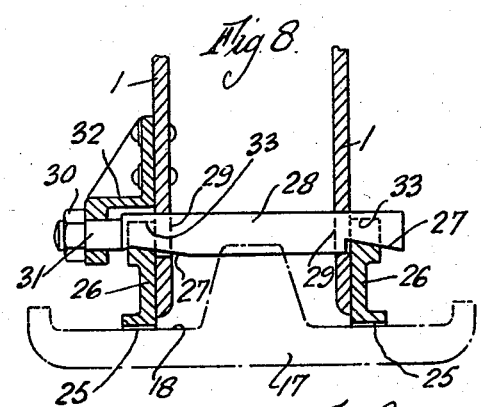
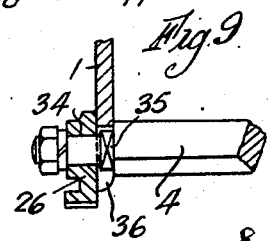
Inventor:
Edward Lionel Firth
By Baldwin Wright
his Attorneys.

Patented May 22, 1928.

1,670,718

UNITED STATES PATENT OFFICE.

EDWARD LIONEL FIRTH, OF HOUNSLOW, ENGLAND, ASSIGNOR TO ROADLESS TRACTION LIMITED, OF HOUNSLOW, ENGLAND.

SPROCKET WHEEL.

Application filed August 1, 1927, Serial No. 209,961, and in Great Britain May 3, 1926.

This invention relates to sprocket wheels and more particularly of the type in which the teeth proper are formed on the endless link or other member and engage grooves or elements on the sprocket constituting the teeth or driving surfaces.

In such sprocket wheels it has been found, and especially in the case of endless track vehicles to which type of sprocket wheel this invention more particularly relates, that after a certain amount of use, the grooves or elements constituting the teeth or driving surfaces become worn, as also does that part or parts of the sprocket upon which the chain or other endless link members rest.

In this connection it should be noted that in conventional chain drives, the usual practice is that those elements of the sprocket which drive the chain and that part or parts of the sprocket upon which the chain rests, or upon which the articulated plates attached to the chain rest, (as in the case of endless track vehicles) are one and the same.

We have found, however, and especially in the inserted tooth type of sprocket, that these two elements are functionally separated, that is, the teeth drive and drive only, while a separate diameter is provided on the sprocket for the support of the chain or articulated plates forming the track shoes. It is therefore, necessary in order to obtain accuracy of drive to co-ordinate these two functionally separated elements by making a relative adjustment between the sprocket teeth and that part or parts of the sprocket, hereinafter referred to as the sprocket diameter, supporting the track plates which form the shoes, no matter how carefully this relationship may be calculated beforehand, it is impossible to arrive at the exact dimension of the sprocket diameter on which the track plates are supported, and unless correctness in pitch between the chain and the sprocket is obtained, the drive is inefficient. In practice, this necessitates the taking down of the sprocket and the adjustment of the diameter. The amount of adjustment required being sometimes as small as 3/100ths of an inch, which, however, makes all the difference in the correct meshing of the teeth. Further, after the vehicle has been run for some time and the link joints have worn, thereby increasing the pitch of the chain, similar trouble occurs and it is necessary again to adjust the drive.

One of the objects of the invention is the construction of a sprocket wheel in which the teeth may easily be renewed and a further object consists in the provision of a sprocket where adjustability of the pitch of the teeth and sprocket diameter may be obtained.

According to one feature of this invention the teeth are constructed of a number of elements having similar surfaces adapted to be fixed in succession in the operative position, a fresh surface being moved into the operative position when the other surface is worn.

In one embodiment of the invention the sprocket wheel comprises two plates in each of which are formed a plurality of pairs of holes forming bearing sockets in which are mounted the elements constituting the teeth or driving surfaces; the metal between the holes being cut away in order to allow of the insertion of teeth which may consist of bars of square section having grooves whose bases engage with the holes formed in the sprocket plates. Preferably the holes in the plates are semi-circular when the bases of the grooves are circular, to facilitate manufacture.

The teeth are held in position by bolts, each bolt having two surfaces which engage a surface on each tooth, the bolt being secured by a screw nut, between which and the teeth is a plate having edges so bevelled as to make good contact with the surfaces of the teeth.

The operative surface of the teeth may be other than plane since the surfaces may be cycloidal, and the cross section of the bar may be triangular or polygonal.

According to another feature of the invention, the diameter of the sprocket is adjustable, the sprocket preferably being provided with a number of radially adjustable members, having surfaces to form the diameter and adapted to engage and support the track or other endless link member, and means for effecting the adjustment of said members.

In one construction a number of bolts may be provided mounted on the periphery of the sprocket and located intermediate the grooves or elements constituting the teeth or driving surfaces thereof, the outer ends of which, in the case of an endless track, are adapted centrally to engage and support the track plates forming the shoes.

In an alternative construction the bolts may be located so as each to engage the ends of adjacent links, and for this purpose may be Y-shaped, the arms of the Y's engaging the two ends of an adjacent pair of links.

According to a further feature of the invention the sprocket teeth alone or in conjunction with the sprocket diameter is or are adjustable as to pitch.

The sprocket teeth may be adjustably mounted in radial slots formed in the periphery of the sprocket wheel, and in one construction pairs of adjacent teeth may be mounted in a series of plates adjustably carried by the sprocket wheel. The plates may be set according to the pitch required by means of cam surfaces formed on pins, carried by the sprocket and the transverse movement of which in one direction, cause the plates to move outwardly.

The plates may be provided with track plate or other endless link member engaging surfaces which form the diameter of the sprocket so that on the adjustment of the plates, adjustment of pitch of the sprocket teeth and sprocket diameter is simultaneously effected.

It should be understood that the variation of the diameter of that part of the sprocket upon which the articulated plates bear does not and cannot in effect alter the pitch of the chain, i. e., the pins and yet by altering this dimension the pitch of the chain can be brought into harmony with the pitch of the sprocket whether this adjustment is called for by initial inaccuracies in manufacture or by an increase of the pitch of the chain due to wear. The reason for this seeming anomaly is that the teeth on the sprocket owing to their form have a variable pitch circle which is decided by the diameter of that part of the sprocket upon which the plates attached to the chain bear. The form of sprocket teeth employed in these cases is similar to that used in silent chain practice where the relationship between the pitch of the chain and the sprocket is harmonized owing to the fact that the chain automatically rides out on the pitch diameter of the sprocket. It will be seen, therefore, that by means of the present invention, the pitch of the chain and the pitch of the sprocket can be brought into harmony with one another by merely increasing or decreasing the sprocket diameter which supports the chain and it is therefore, not essential also to provide for the radial adjustability of the sprocket teeth, although this may, if desired, be done.

The invention is illustrated in the accompanying drawings as applied to a sprocket wheel particularly adapted for driving the tracks of endless track vehicles, in which Figure 1 is an elevation of a part of a sprocket wheel, Figure 2 a vertical section on the line 2—2 of Figure 1, and Figure 3 a sectional view on the line 3—3.

Figure 4 is an elevation partly in section showing one method of adjusting the sprocket diameter, Figure 5 being a sectional view thereof, on the line 5—5, Figure 4. Figure 6 is an elevation of an alternative method of adjustment.

Figures 7 and 8 are respectively an elevation and section showing a method of adjusting both the sprocket teeth and sprocket diameter simultaneously. Figure 9 is a detail view.

Referring to the drawings, the sprocket wheel is formed from two plates $a$, having semi-circular holes $b$ cut in pairs around their periphery, the metal between the holes being cut away as at $c$ to allow for the insertion of bar elements $d$ forming the teeth or driving surfaces.

The elements $d$ are shown as being of square section, but may be of any polygonal section, or the driving faces instead of being plane may be cycloidal or of any other suitable curved surface. They are formed with grooves $e$ with circular bases to conform to the circular holes $b$, with which they engage, being held in position by bolts $f$. The heads of the bolts $f$ are provided with surfaces $g$ adapted to lie against the faces of the elements $d$, which are secured between the surfaces $g$ and similarly bevelled surfaces $i$ on plates $h$, by means of nuts $k$.

Rubber or other resilient blocks $l$ are placed in sockets $m$ in the heads of the bolts $f$ and serve to silence the track.

When one driving surface has become worn, a fresh one may be brought into play by merely slackening off the nuts $k$ until the elements on bars $d$, $d$ are freely rotatable.

Referring now to Figures 4 and 5, the sprocket wheel is indicated at 1, and 4 are the renewable driving teeth. Mounted in bosses 14 formed on the sprocket 15 are plates for setting the teeth.

The links of the track are shown at 16 and the plates forming the track shoes at 17, provided with flats 18 at each side thereof for engaging the diameter of the sprocket which in Figures 1 and 2 is shown at 19.

In Figures 4 and 5, the sprocket is provided with a plurality of bolt members around its two peripheries, one pair of which is shown at 20, and which are adjustably held in screwed sockets 21, 22 being nut members by means of which they are secured therein. It will be seen that by slackening off the nut members 22, the bolts 20 may be moved outwardly or inwardly.

The heads 23 of the bolts constitute the parts of the sprocket, referred to as the diameter, supporting the track shoes by engagement with the flats 18, and which diameter is, therefore, adjustable. 24 are projections on the sprocket adapted to engage the track shoes and limit their movement.

Referring to Figure 6, a similar construction is shown, except that instead of the bolts 20 being located on the sprockets so as to engage the centres of the track shoes, they engage the ends thereof. For this purpose, the heads 23 of the bolts are Y-shaped and provided with track shoe engaging surfaces 25.

Referring now to Figures 7, 8 and 9, the driving elements 4 instead of being directly mounted in the sprockets are carried in plates 26, having track shoe engaging surfaces 25, and whose position may be adjustable radially to constitute an adjustable sprocket diameter. As shown the plates 26 are adjusted by means of cam surfaces 27 formed on a pin member 28 which is mounted in holes 29 in the sprocket and adapted to be moved in a plane transverse to the sprocket diameter by screwing or unscrewing a nut 30 on the screwed end of the head 31 of the pin 28, engaging a bracket 32 carried by the sprocket, and through a hole in which the head 31 is passed. The plates 26 are slotted at 33 to embrace the pin 28, the ends of the slots 33 engaging the cam surfaces 27.

The ends of the driving elements 4 are mounted in holes in the plates 26 as indicated at 34, and are formed with squared portions 35 which engage slots 36 in the peripheries of the sprockets and by means of which the position of the elements may be set.

It will be seen, therefore, that by screwing or unscrewing the nut 30, the pin 28 may be moved transversely, the plates 26 being caused to move outwardly or inwardly, whereby the sprocket teeth and sprocket diameter may be simultaneously adjusted.

What I claim is:—

1. In a sprocket wheel comprising two hub plates having corresponding series of holes formed around their peripheries the combination with a plurality of polygonal bar elements forming the sprocket teeth, of means for mounting said elements in pairs in said holes and for setting them with their surfaces in correct driving position.

2. In a sprocket wheel comprising two hub plates having corresponding series of holes formed in pairs around their peripheries, the combination with a plurality of polygonal bar elements forming the sprocket teeth and having grooves with circular bases, of means for mounting pairs of said elements in their respective holes and means engaging one of the free surfaces of a pair of elements for setting them in correct driving position.

3. In a sprocket wheel comprising two hub plates having corresponding series of holes formed around their peripheries, the combination with a plurality of polygonal bar elements forming the sprocket teeth and having grooves with circular bases, of pairs of semi-circular recesses in the sides of said holes for receiving the grooved portions of said elements, and bolts whose heads are provided with bevelled surfaces adapted to engage a free surface of each of said elements for holding them in correct driving position.

4. In a sprocket wheel comprising two hub plates having corresponding series of holes formed around their peripheries the combination with a plurality of polygonal bar elements forming the sprocket teeth, of means for mounting said elements in pairs in said holes and for setting them with their surfaces in correct driving position and adjustable means mounted adjacent the peripheries of the hub plates for correcting the sprocket diameter.

In testimony that I claim the foregoing as my invention I have signed my name this 21st day of July 1927.

EDWARD LIONEL FIRTH.